United States Patent [19]
Eller

[11] Patent Number: 5,045,764
[45] Date of Patent: Sep. 3, 1991

[54] MOTOR MONITOR SWITCHING SYSTEM

[75] Inventor: Dieter Eller, Essen, Fed. Rep. of Germany

[73] Assignee: EUBA-Antriebstechnik Eller GmbH, Essen, Fed. Rep. of Germany

[21] Appl. No.: 507,414

[22] Filed: Apr. 5, 1990

[30] Foreign Application Priority Data

Apr. 12, 1989 [DE] Fed. Rep. of Germany ... 8904581[U]

[51] Int. Cl.$^5$ ........................................... H02H 7/085
[52] U.S. Cl. .................................... 318/280; 318/490; 318/434
[58] Field of Search ............... 318/280, 490, 564, 565, 318/434

[56] References Cited

U.S. PATENT DOCUMENTS

| | | | |
|---|---|---|---|
| 3,848,160 | 11/1974 | Boothman et al. | 317/27 R |
| 3,979,720 | 9/1976 | Laas et al. | 340/146.1 BE |
| 4,199,799 | 4/1980 | Ostenso et al. | 361/78 |
| 4,636,961 | 1/1987 | Bauer | 364/474 |
| 4,682,263 | 7/1987 | Gradnitzer et al. | 361/31 |
| 4,749,920 | 6/1988 | Jaeger et al. | 318/112 |
| 4,864,287 | 9/1989 | Kierstead | 340/648 |

Primary Examiner—Bentsu Ro
Attorney, Agent, or Firm—Browdy and Neimark

[57] ABSTRACT

A monitoring circuit connected between a motor and a motor reversing switch is shown and described. The monitoring circuit has a current transformer connected to the power line to be measured, two secondary variable monitoring circuits for measuring the actual current value of the motor, and actual value analyzers for controlling the monitoring circuits. One of the secondary variable monitoring circuits is switched on while the other is switched off.

4 Claims, 3 Drawing Sheets

MOTOR MONITOR SWITCHING SYSTEM

BACKGROUND OF THE INVENTION

1. Field of the Invention

The invention relates to a motor monitor switch for an electric motor which is reversible in its direction of rotation, with a direction of rotation reversal circuit which can be put in the power supply lines of the electric motor and with a monitoring circuit, which can be put in the power supply lines to be monitored between the direction of rotation reversal circuit and the electric motor, the direction of rotation reversal circuit having a plurality of reversing switch contacts, the monitoring circuit having at least one current transformer which can be put in the power supply line to be monitored, a monitoring circuit for the actual current value, an overload protection switch and a voltage supply circuit, where the monitoring circuit for the actual current value is connected with its input to a secondary coil of the current transformer and with its output to the overload protection switch and comprises an actual value analyzing step and a control step placed downstream of the actual value analyzing step, i.e. is disposed on the output side, and where the response level of the monitoring circuit for the actual current value can be varied.

2. The Prior Art

The known motor monitor switch on which the invention is based (German Published, Non-examined Patent Application DE-OS 27 04 820) can be used, because of its specialized design for use with electric motors with totally different rated currents, over a wide range of possible rated currents. In various other respects this motor monitor switch is also constructed in a particularly practical manner. For example, an appropriate delay circuit has been provided in consideration of a start-up current which mostly is much higher than the rated current, the overload protection switch is supplied with a set voltage by the voltage supply circuit, and the monitoring of the actual current value has been provided with a specially designed actual value analyzing step and a specially designed control step. In this connection, reference is made to German Published, Non-examined Patent Application DE-OS 27 04 820, the contents of its disclosure being made the contents of the disclosure of the present application by reference.

The known motor monitor switch can be used in connection with electric motors having a set direction of rotation as well as with electric motors with a reversible direction of rotation. In the latter case it is understood that a conventional direction of rotation reversal circuit is naturally a part of such a motor monitor switch, in this case such a motor monitor switch comprises a direction of rotation reversal circuit which can be put in the power supply lines of the electric motor as well as a monitor circuit which can be put in the power supply lines of the electric motor which are to be monitored. For example, in a three-phase a.c. motor, two of the three phases are monitored by the monitoring circuit, reversal of the direction of rotation of the electric motor being accomplished by a change of the two phases, which is of no consequence for the monitoring circuit. This poses no problem for electric motors operating symmetrically, i.e. electric motors in which the monitoring circuit of the motor monitor switch is intended to have one and the same response level for both directions of rotation. However, problems occur when it is intended to provide different response levels for the directions of rotation of the electric motor. The term response level should be understood in the broadest sense of the word, therefore it does not only mean the absolute value of a current which is perhaps being monitored but also, for example, the length of time a set value is exceeded, a combination of the two criteria or other relevant criteria.

BRIEF DESCRIPTION OF THE INVENTION

It is therefore an object of the invention to design and improve the known motor monitor switch in such a way that different response levels can be set for both directions of rotation of the electric motor.

The above object is attained in that the monitor circuit has two monitoring circuits for the actual current value, which preferably are identical in regard to circuit design, that change-over contacts are switched upstream of the input side of the monitoring circuit for the actual current value and that via the change-over contacts one of the monitoring circuits for the actual current value is switched on and the other one of the monitoring circuits for the actual current value is switched off and that the changeover contacts are controlled by the reversing switch contacts or in accordance with the control of the reversing switch contacts. In accordance with the invention, a separate monitoring circuit for the actual current value is provided for each direction of rotation of the electric motor, only the monitoring circuit for the actual current value associated with the appropriate direction of rotation being activated by the contacts. Because of this it is possible to preset a different response level for each direction of rotation. Here too, response level is to be understood in the broadest sense of the word.

It is possible to provide completely different response criteria for the two directions of rotation if the monitoring circuits for the actual current values are used which are different in their circuit design. However, in most cases the response criteria, which in the final analysis determine the response level in the sense of the teaching of this invention, will not be so very different or only one response criteria will be different. In this case it is also possible to use the monitoring circuit for the actual current values which agree in their circuit design to a large degree.

If, as previously described and known from the state of the art, only one adjustable component is provided for setting the response level of the monitoring circuit for the actual current value, in particular an adjustable resistor, the teaching of the invention can be alternatively realized in that the monitoring circuit for the actual current value has two adjustable components connected parallel to each other, in that the adjustable components are connected in series with a common change-over contact or, preferably, with a common change-over contact each upstream and downstream, in that via the change-over contact(s) one adjustable component is switched on and the other adjustable component is switched off and in that the change-over contacts are controlled by the reversing switch contacts or in accordance with the control of the reversing switch contacts. In this way, a response level differently adjustable for both directions of rotation has been realized with a minimum of effort, namely, ly merely realizing the change-over contacts and the use of two parallel connected adjustable components, in particular adjustable resistors.

The invention will be described below by means of drawings showing only exemplary embodiments. In this connection further preferred embodiments and improvements of the teaching of the invention in regard to both alternatives will also be described, in particular to the extent that they are described by the dependent claims.

DESCRIPTION OF THE PREFERRED EMBODIMENTS

Figure 1:
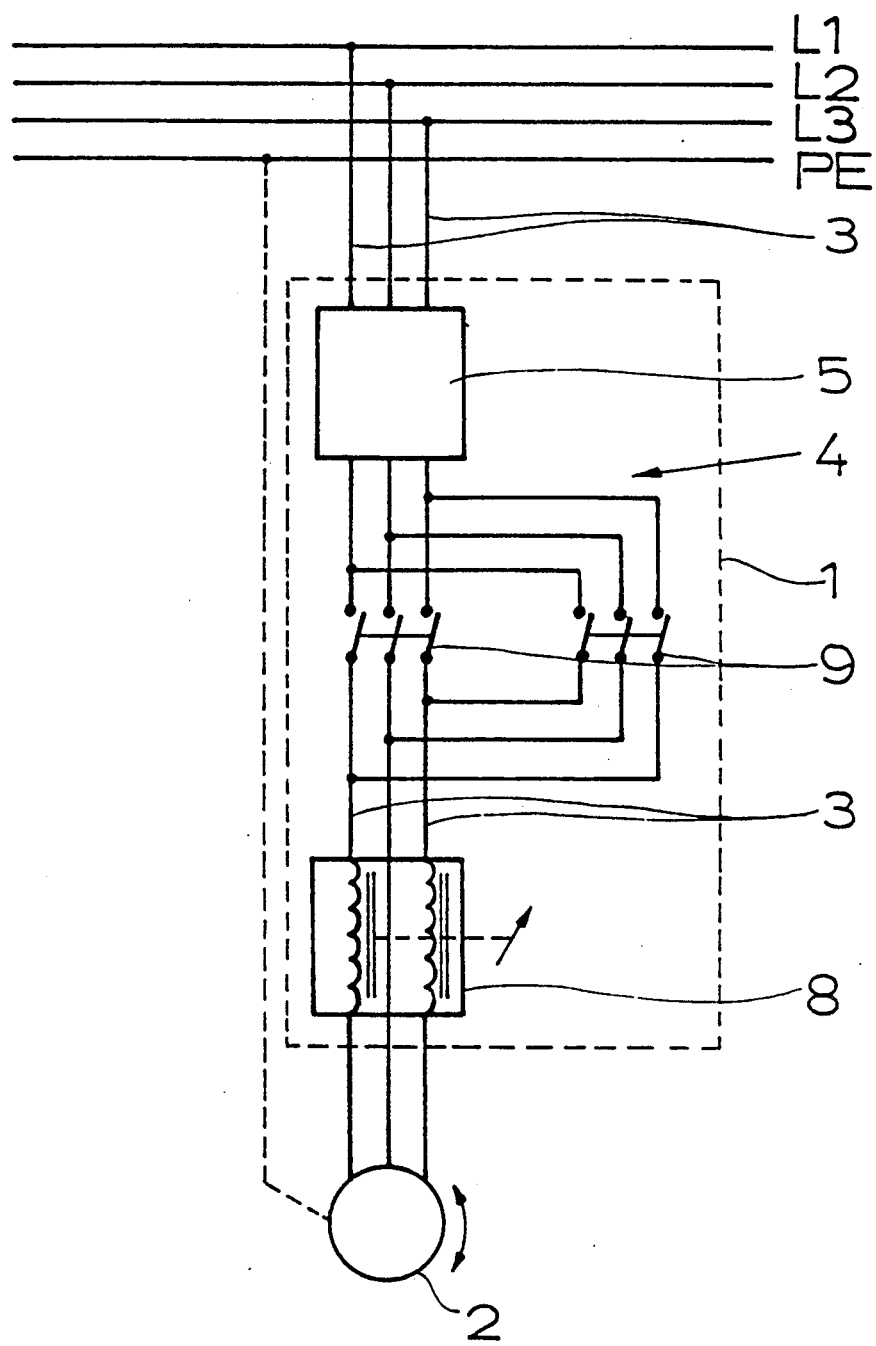
FIG. 1 is a schematic view of the circuitry of an electric motor, reversible in its direction of rotation, with a motor monitor switch in accordance with the invention.
Figure 2:
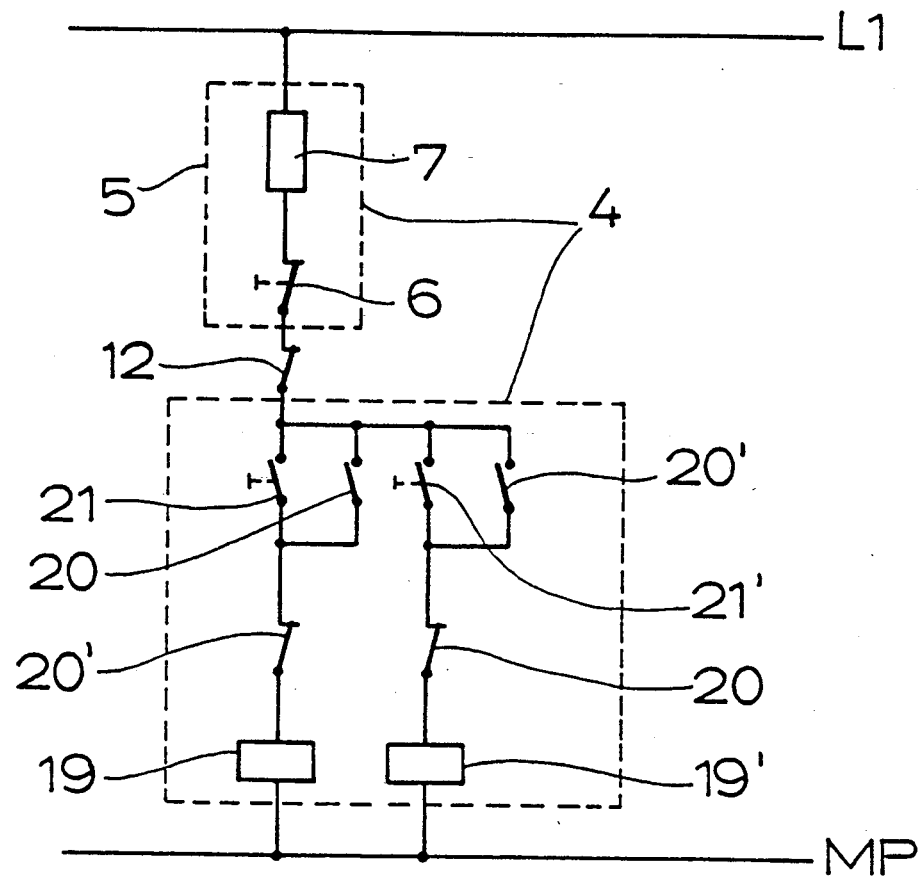
FIG. 2 is the circuit design details for a power supply line to be monitored.

FIG. 1 shows, as a particularly preferred exemplary embodiment of a motor monitor switch 1, an electric motor 2 in the form of a three-phase a.c. motor, the three phase connectors L1, L2, L3 as well as the equipment grounding conductor PE of which have been drawn in here. Not shown is an also present center connection Mp which, however, can be seen in FIG. 2. The electric motor 2 is an electric motor which can be reversed in the direction of its rotation, so that the motor monitor switch 1 of the exemplary embodiment shown has a direction of rotation reversal circuit 4, which is put in the power supply lines 3. A main switch 5 is also part of the direction of rotation reversal circuit 4, which, as is known, comprises a main contact 6 (FIG. 2) in series with a fuse 7 (FIG. 2). Between the direction of rotation reversal circuit 4 and the electric motor 2, a monitoring circuit 8 is put into the power supply lines 3 of the electric motor 2 to be monitored. The direction of rotation reversal circuit 4 has a plurality of reversing switch contacts 9, six in the exemplary embodiment shown. The monitoring circuit 8 has at least one current transformer 10, in the exemplary embodiment shown two current transformers 10, a monitoring circuit for the actual current value 11, an overload protection switch 12, which is switched into at least one the power supplies lines 3, preferably in all power supply lines 3, by means of contacts and a voltage supply circuit 13. The current transformer 10 has a primary coil 14 and a secondary coil 15, the monitoring circuit for the actual current value 11 being connected on the input side to the secondary coil 15 of the current transformer 10. Incidentally, in connection with the exemplary embodiment shown in FIG. 3, there are two current transformers 10 provided for two power supply lines 13 to be monitored, which are connected parallel to each other and operate on one and the same monitoring circuit for the actual current value 11. Furthermore, in FIG. 2 the contact of the overload protection switch 12 has been provided with the appropriate reference numerals, while in FIG. 3 the exciter coil of the overload protection switch 12, here in the form of a relay or contactor, is identified by the appropriate reference numeral. The monitoring circuit for the actual current value 11 is furthermore connected on the output side with the overload protection switch 12 and is again comprised of an actual value analyze 16 and a controller 17, placed downstream of it, i.e. on the output side. By means of the adjustable component 18 in the form of a potentiometer shown it has been indicated that the response level, in this case the response current, can be set in the monitoring circuit for the actual current value 11. The basic design of the motor monitor switch 1 described so far, or of the monitoring circuit 8 of this motor monitor circuit 1 has, on the one hand, already been extensively described above and, on the other, is known from German Published, Non-examined Patent Application DE-OS 27 04 820, so that to this extent reference is again made to the disclosure contents of German Published, Nonexamined Patent Application DE-OS 27 04 820 and this is also made the disclosure contents of the present application. The following added remarks are, in connection with FIG. 2, directed to the mode of operation of the direction of rotation reversing circuit 4:

Exciter coils 19, 19' and associated switch contacts 20, 20' or manual switch contacts 20, 20' are found, connected in series with the main switch 5 and the overload protection switch 12, between a phase L1 and the center connection Mp. By means of this arrangement it is attained that no more than one exciter coil 19 or 19' ever carries a current and this only after the main contact 6 has been previously opened manually and closed again. The exciter coil 19, the switch contacts 20 and the manual switch contact 21 correspond in this case to the reversing switch contacts 9 disposed in FIG. 1 in the continuous power supply lines 3, while the exciter coil 19', the switch contacts 20' and the manual switch contact 21 correspond to the reversing switch contacts 9 shown offset to the right in FIG. 1, i.e. correspondingly change their switched state simultaneous with them.

In accordance with the invention it is essential for the motor monitor switch 1 shown that the monitoring circuit 8 has two monitoring circuits for the actual current values 11, 11' which preferably are identical in regard to circuit design, that changeover contacts 22 are switched upstream of the monitoring circuit for the actual current values 11, 11' and that via the changeover contacts 22 one of the monitoring circuits for the actual current values 11, 11' is switched on and the other one of the monitoring circuits for the actual current values 11, 11' is switched off and that the changeover contacts 22 are controlled by the reversing switch contacts 9 or in accordance with the control of the reversing switch contacts 9. Furthermore, it is true for the exemplary embodiment shown that change-over contacts 22 corresponding to and disposed corresponding to the monitoring circuit for the actual current values 11, 11' are also switched downstream on the output side. The circuit arrangement described before succeeds, and in the exemplary embodiment shown and preferred succeeds completely, in activating only one monitoring circuit for the actual current values 11, 11' assigned to the corresponding direction of rotation of the electric motor 2, which results in the advantages described in the general part of the description.

Figure 3:
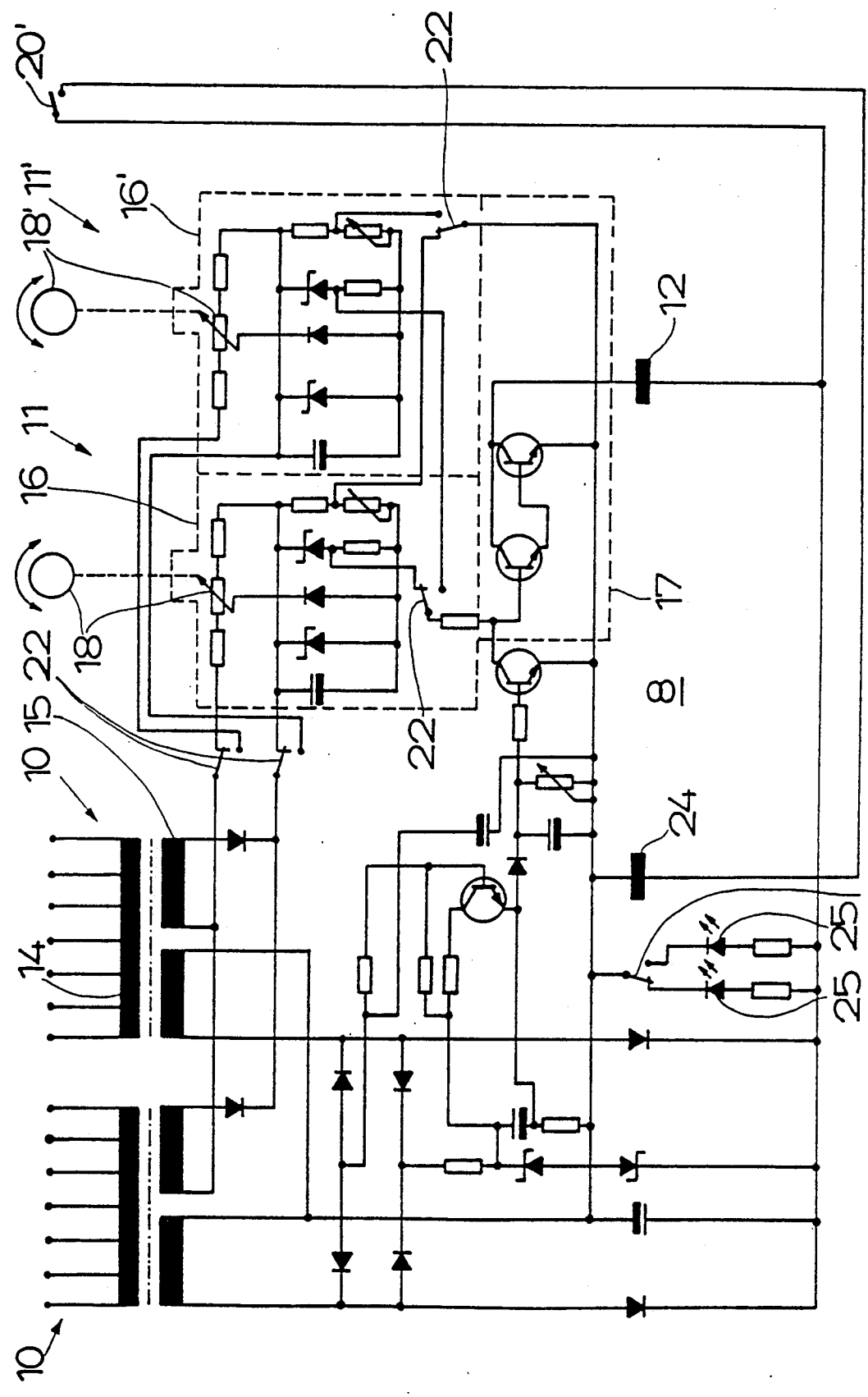
FIG. 3 is a detail block diagram of a first exemplary embodiment of the monitor circuit of a motor monitor switch in accordance with the invention.

It is furthermore true for the exemplary embodiment shown in FIG. 3 that in this case the change-over of the monitoring circuit for the actual current values 11, 11' only relates to the appropriate actual value analyzing step 16 or 16', i.e. that both monitoring circuits for the actual current values 11, 11' have a common control step 17. This takes into account the fact that all possible differences in the response level, i.e. all possible different response criteria, can be realized in the actual value analyzing steps 16 or 16', the control step 17 being used in each case only for control of the overload protection switch 12 by means of the correct control current and the correct control voltage. Therefore the control step 17 can be used for both monitoring circuits for the actual current values 11, 11' together. Correspondingly it is also true in the exemplary embodiment shown here that the change-over contacts 22 at the output side are disposed between the actual value analyzing steps 16, 16' and the common control step 17.

Figure 4:
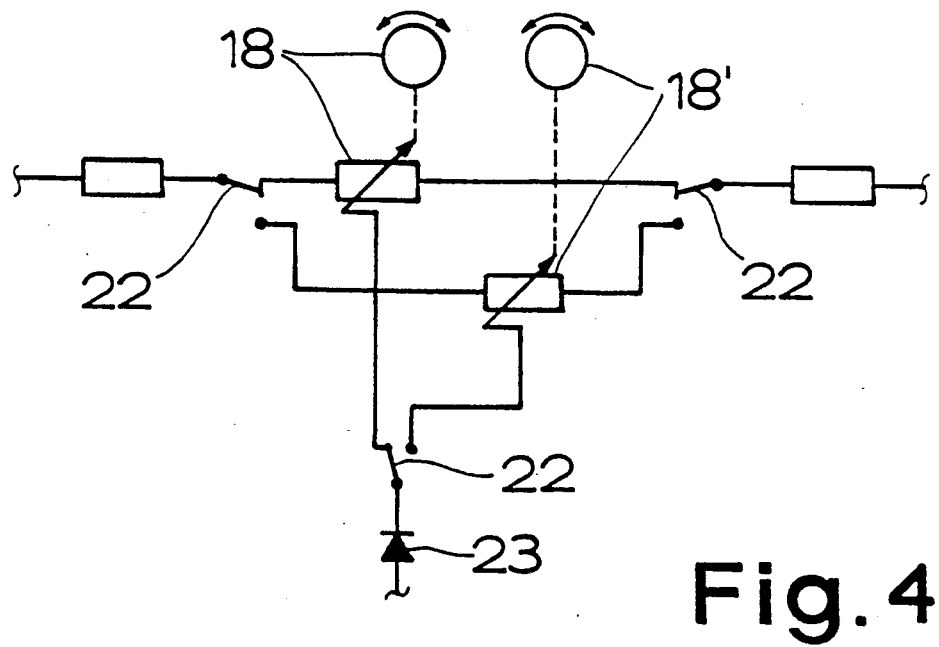
FIG. 4 is a partial view of a monitoring circuit for the actual current value for a second exemplary embodiment of a motor monitor switch.

FIG. 4 shows in a partial view, namely only in the area of the series arrangement of the three resistors assigned to the adjustable components 18 or 18' or comprising the latter, a monitoring circuit 8 of a modified exemplary embodiment which is considerably simplified in its circuit design. It is essential in this exemplary embodiment that only one adjustable component is required for setting the response level of the monitoring circuit for the actual current value 11, namely in this case and preferably an adjustable resistor, but for example also an adjustable capacitor or the like. It is essential that in this case in accordance with this teaching of the invention, in spite of the planned capability of setting different response levels for the two directions of rotation of the electric motor 2, basically only a single monitoring circuit for the actual current value 11 is provided, but that this monitoring circuit for the actual parallel each other, that the adjustable components 18, 18' are connected in series with a common change-over contact 22 or, preferably with a common change-over contact 22 each upstream and downstream, that via the change-over contact 22 or the change-over contacts 22 one adjustable component 18 or 18' is switched on and the other adjustable component 18 or 18' is switched off and that the change-over contacts 22 are controlled by the reversing switch contacts 9 or in accordance with the control of the reversing switch contacts 9. It is true for the exemplary embodiment shown that, because of the particular circuitry of the adjustable components 18, 18' in connection with a diode 23, by means of which the bridge input of the incidentally provided bridge circuit is connected to the resistor series circuit, a total of three changeover contacts 22 are provided for the change-over in accordance with the different directions of rotation of the electric motor 2. Thus the appropriate desired response level can be realized with the simplest switching design arrangements.

There are several possibilities for the realization of the desired control of the change-over switches 22 from the direction of the reversing switch contacts 9. The circuit arrangement realized here operates with a change-over relay, the auxiliary contacts of which are the change-over contacts 22 and the exciter coil 24 of which is controlled in accordance with the change-over of the reversing switch contacts 9. Of course there are fundamentally different forms of realization, for example via thyristor circuits or the like.

In connection with the exemplary embodiment shown it is true, that the exciter coil 24 of the change-over relay is located, in series, with a reversing switch contact 9 or an appropriately switched switch contact 20', between the positive and negative poles of the voltage supply circuit 13 of the monitoring circuit L/0 8. Assignment to the exciter coil 19' applies here, if this 10 exciter coil 19' carries current, the switch contact 20', shown in the upper right of FIG. 3, closes and the exciter coil 24 of the change-over relay carries current, so that the change-over contacts 22 of FIG. 3 are switched over from the switch position shown into the other switch position.

The embodiment of the motor monitor switch 1 illustrated in FIG. 3 is further characterized in that the display elements 25 are in the form of LEDs. In the exemplary embodiment shown, the two display elements 25 are LEDs requiring operation with a suitable control voltage, so that connection with the voltage supply circuit 13 is particularly practical. The display element corresponding to the appropriate direction of rotation of the electric motor 2 lights up, but, in the illustrated and preferred exemplary embodiment only if the electric motor 2 is actually turned on. Incidentally, it is true that such display elements 25 can, of course, also be used in the exemplary embodiment in accordance with FIG. 4.

What is claimed is:

1. A motor monitor switching system for a reversible electric motor, comprising:
   a motor reversing circuit having a plurality of reversing switch contacts for reversing the motor rotational direction, wherein said reversing circuit is connected to the power supply lines of the motor; and
   a monitoring circuit connected between the reversing circuit and the motor for monitoring said power supply lines;
   wherein said monitoring circuit comprises:
   at least one current transformer connected to the power supply line to be monitored;
   two secondary variable monitoring circiuts preferably of identical circuit design, for measuring actual current value of the motor;
   an overload protection switch;
   change-over contacts;
   a voltage supply circuit; and
   a control means;
   wherein each secondary variable monitoring circuit has an actual value analyzer means, and is connected at its input to a secondary coil of the current transformer and at its output to the overload protection switch;
   wherein the control means is connected to the actual value analyzer means;
   wherein the change-over contacts are connected to the input side of each of the secondary variable monitoring circiuts via the change-over contacts, whereby one of the secondary variable monitoring circiuts is switched on and the other is switched off; and
   wherein the change-over contacts are controlled by the reversing switch contacts or in accordance with the control of the reversing switch contacts.

2. A motor monitor switching system in accordance with claim 1, wherein the change-over contacts are also switched at the output side of the secondary variable monitoring circiuts.

3. A motor monitor switching system in accordance with claim 1, wherein both secondary variable monitoring circiuts are commonly controlled by the control means.

4. A motor monitor switching system in accordance with claim 1, wherein the change-over contacts are disposed between the actual value analyzer means and the control means.

* * * * *